United States Patent
Banker et al.

(10) Patent No.: US 7,290,274 B1
(45) Date of Patent: Oct. 30, 2007

(54) CONTEXT SENSITIVE TELEVISION MENU

(75) Inventors: Robert O. Banker, Cumming, GA (US); John M. Schlarb, Alpharetta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 621 days.

(21) Appl. No.: 09/693,606

(22) Filed: Oct. 20, 2000

(51) Int. Cl.
*G06F 3/00* (2006.01)
*G06F 13/00* (2006.01)
*H04N 5/445* (2006.01)

(52) U.S. Cl. .................... 725/37; 725/52; 725/56; 725/134; 725/142

(58) Field of Classification Search ............. 725/37, 725/52, 59, 86, 100, 101, 104, 61, 39, 56, 725/134, 142; 707/100–102, 104.1; 715/700, 715/708
See application file for complete search history.

(56) References Cited

U.S. PATENT DOCUMENTS

| 4,706,121 A | 11/1987 | Young |
| 4,751,578 A | 6/1988 | Reiter et al. |
| 4,885,775 A | 12/1989 | Lucas |
| 4,908,713 A | 3/1990 | Levine |
| 4,963,994 A | 10/1990 | Levine |
| 4,991,011 A | 2/1991 | Johnson et al. |
| 5,038,211 A | 8/1991 | Hallenbeck |
| 5,253,066 A | 10/1993 | Vogel |
| 5,293,357 A | 3/1994 | Hallenbeck |
| 5,477,262 A | 12/1995 | Banker et al. |
| 5,479,268 A | 12/1995 | Young et al. |
| 5,508,815 A | 4/1996 | Levine |
| 5,568,272 A | 10/1996 | Levine |
| 5,592,551 A * | 1/1997 | Lett et al. .................... 380/211 |
| 5,659,350 A * | 8/1997 | Hendricks et al. .......... 725/116 |
| 5,809,204 A | 9/1998 | Young et al. |
| 5,850,218 A * | 12/1998 | LaJoie et al. ................. 725/45 |
| 5,898,919 A * | 4/1999 | Yuen .......................... 455/420 |
| 5,915,068 A | 6/1999 | Levine |
| 5,940,071 A | 8/1999 | Treffers et al. |
| 6,020,930 A | 2/2000 | Legrand ..................... 348/569 |
| 6,111,614 A | 8/2000 | Mugura et al. ............. 348/569 |
| 6,141,678 A | 10/2000 | Britt, Jr. ..................... 709/200 |
| 6,314,572 B1 * | 11/2001 | LaRocca et al. .............. 725/60 |
| 6,392,664 B1 * | 5/2002 | White et al. ................. 715/717 |
| 6,536,041 B1 * | 3/2003 | Knudson et al. ............. 725/39 |
| 6,604,240 B2 * | 8/2003 | Ellis et al. .................... 725/45 |
| 6,662,007 B2 * | 12/2003 | Yuen .......................... 455/419 |
| 6,738,978 B1 * | 5/2004 | Hendricks et al. ............ 725/35 |

FOREIGN PATENT DOCUMENTS

| EP | 0340643 | 11/1989 |
| EP | 0794670 | 9/1997 |
| GB | 2323489 | 9/1998 |
| GB | 2343076 | 4/2000 |
| WO | WO94/13107 | 6/1994 |

* cited by examiner

*Primary Examiner*—Ngoc Vu

(57) ABSTRACT

A television menu system generates a television menu that is context sensitive based upon a service currently being provided to a user. In one implementation, a type of television service currently being viewed by a user determines whether particular menu items are presented to the user. In another implementations, determining which channel is being provided dictates whether particular menu options are included.

24 Claims, 11 Drawing Sheets

FIG. 10

VOD SETTINGS

PURCHASE LIST

| | | |
|---|---|---|
| RULES OF ENGAGEMENT | SINGLE VIEWING | 10/17 |
| FINAL DESTINATION | SIX HOUR | 10/19 |
| FLINTSTONES IN VIVA LAS... | TWO DAY | 10/20 |
| U-571 | SINGLE VIEWING | 10/30 |
| FREQUENCY | TWO DAY | 11/15 |

◄ sel ►

EXIT ○ RETURN TO CATALOG

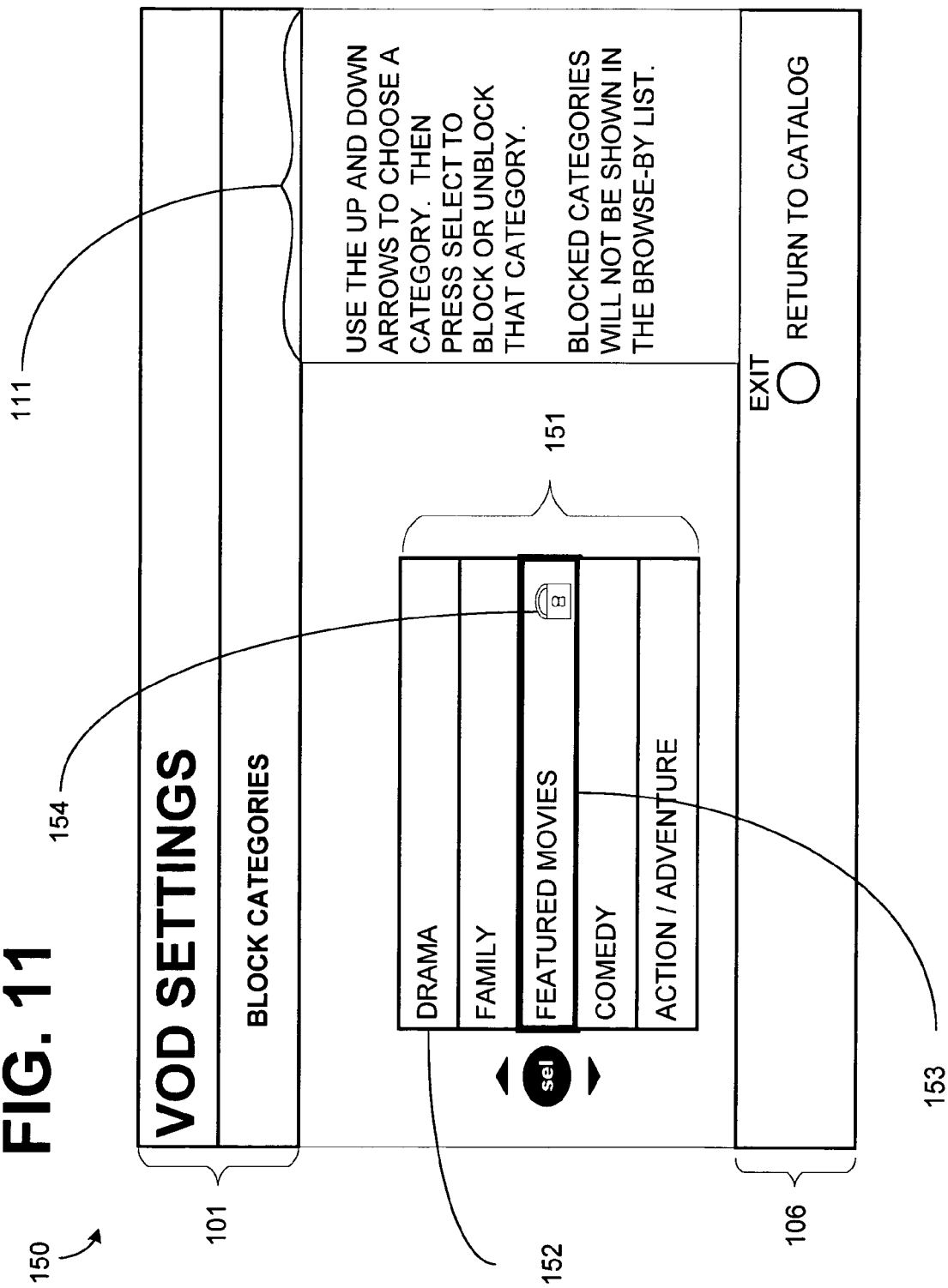

CONTEXT SENSITIVE TELEVISION MENU

FIELD OF THE INVENTION

This invention relates in general to television systems, and more particularly, to the field of media-on-demand.

BACKGROUND OF THE INVENTION

With recent advances in digital transmission technology, cable television systems are now capable of providing much more than the traditional analog broadcast video. In implementing enhanced programming, the home communication terminal ("HCT"), otherwise known as the settop box, has become an important computing device for accessing video services and navigating a subscriber through a maze of services available. In addition to supporting traditional analog broadcast video functionality, digital HCTs (or "DHCTs") now also support an increasing number of two-way digital services such as video-on-demand.

Typically, a DHCT is connected to a cable or satellite television network and includes hardware and software necessary to provide the functionality of the digital television system at the client's site. Preferably, some of the software executed by a DHCT is downloaded and/or updated via the cable television network. Each DHCT also typically includes a processor, communication components and memory, and is connected to a television or other display device, such as a personal computer. While many conventional DHCTs are stand-alone devices that are externally connected to a television, a DHCT and/or its functionality may be integrated into a television or personal computer, as will be appreciated by those of ordinary skill in the art.

DHCTs provide users with a wide variety of television related menu options such as, for example, a menu option for viewing an interactive program guide. As the number of available television services and corresponding menu options increases, it can become inconvenient and time consuming for users to search for and find a desired menu option. Therefore there exists a need to make it easier and more convenient for users to access desired television menu options.

SUMMARY OF THE INVENTION

A television menu system generates a television menu that is context sensitive based upon a service currently being provided to a user. In one implementation, a type of television service currently being viewed by a user determines whether particular menu items are presented to the user. In another implementation, determining which channel is being provided dictates whether particular menu options are included.

BRIEF DESCRIPTION OF THE DRAWINGS

FIG. 10 depicts an example window 120 that illustrates a VOD purchase list that is provided by the DHCT shown in FIG. 3.

FIG. 11 depicts an example screen that illustrates a VOD block categories list that is provided by the DHCT shown in FIG. 3.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
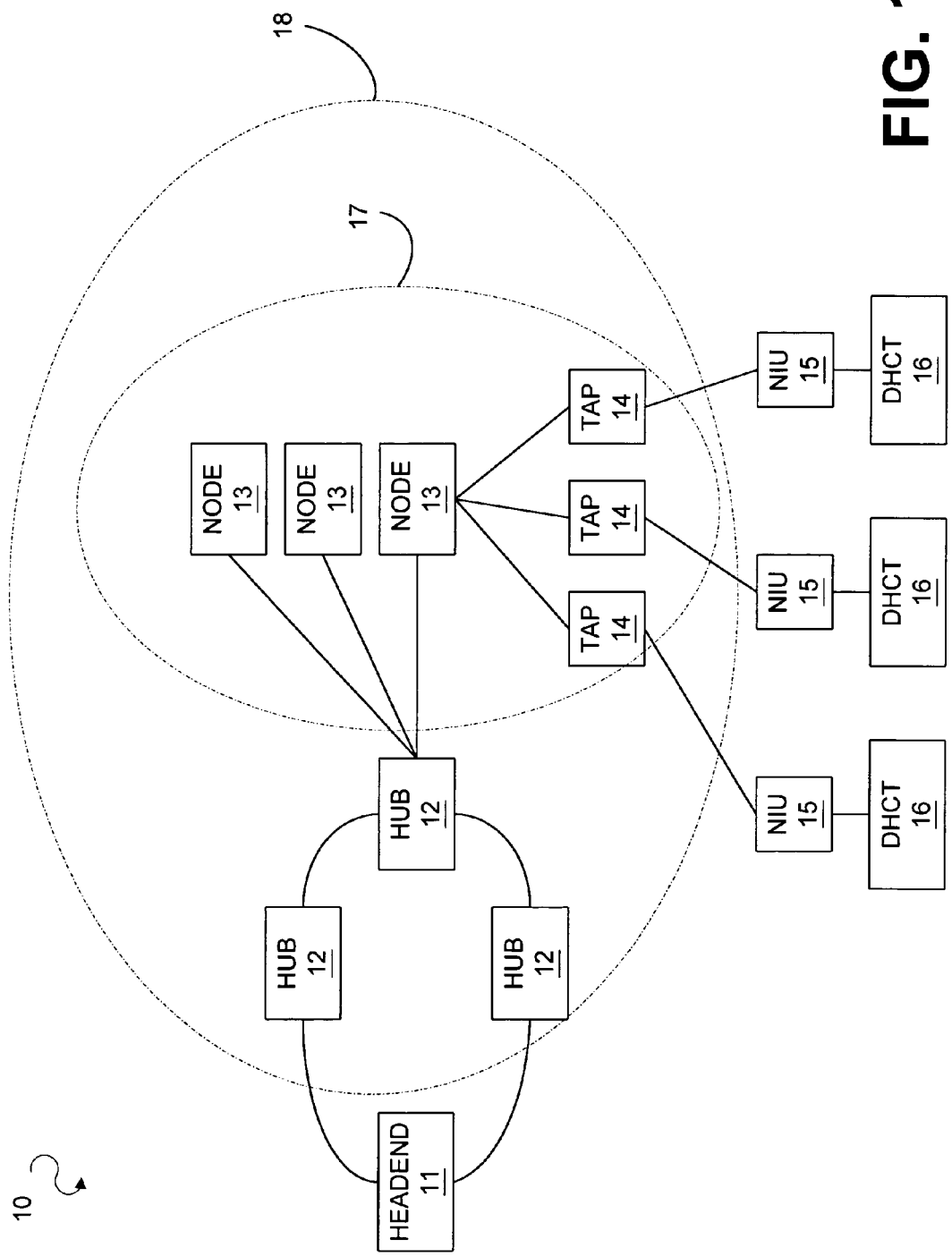
FIG. 1 is a block diagram of a cable television system in accordance with one preferred embodiment of the present invention.

The present invention is generally implemented as part of a cable television system (CTS). Hence, an illustrative CTS 10 and its operation will be described initially. FIG. 1 shows a block diagram view of a CTS 10, which is generally a high quality, reliable and integrated network system that features video, audio, voice and data services to DHCT users. Although FIG. 1 depicts a high level view of a CTS 10, it should be appreciated that a plurality of cable television systems can tie together a plurality of regional networks into an integrated global network so that DHCT users can receive content provided from anywhere in the world.

The CTS 10 delivers broadcast video signals as digitally formatted signals in addition to delivering traditional broadcast analog video signals. Furthermore, the system can support one way broadcast services as well as both one-way data services and two-way media and data services. The two-way operation of the network allows for user interactivity with services, such as Pay-Per-View programming, Near Video-On-Demand (NVOD) programming according to any of several known NVOD implementation methods, View-on-Demand (VOD) programming (according to any of several known VOD implementation methods), and interactive applications, such as Internet connections and interactive media Guide (IMG) applications.

The CTS 10 also provides the interfaces, network control, transport control, session control, and servers to access content and services, and distributes content and services to DHCT users. As shown in FIG. 1, a typical CTS 10 comprises a headend 11, hubs 12, an HFC access network 17, and users' digital home communication terminals (DHCTs) 16. It should be appreciated that although a single component (e.g. a headend) is illustrated in FIG. 1, a CTS 10 can feature a plurality of any one of the illustrated components or may be configured with alternative embodiments for any one of the individual components or with yet other additional components not enumerated above. A content provider (not shown) transmits media content to a headend for further transmission to users downstream in the network.

Content provided by a content provider is communicated by the content provider to one or more headends 11. From those headends the content is then communicated over a communications network 18 that includes a plurality of HFC access networks 17 (only one HFC access network 17 is illustrated). The HFC access network 17 typically comprises a plurality of HFC nodes 13, each of which may serve a local geographical area. The hub 12 connects to the HFC node 13 through a fiber portion of the HFC access network 17. The HFC node 13 is connected to a tap 14 which is connected to a network interface unit (NIU) 15 which is connected to a DHCT 16. The NIU 15 is normally located at a user's property and provides a transparent interface between the HFC node 13 and the users' internal wiring. Coaxial cables are typically used to couple nodes 13, taps 14 and NIUs 15 because the electrical signals can be easily repeated with radio frequency (RF) amplifiers.

As the high-level operations of many of the functions of CTSs 10 are well known to those of skill in the art, further description of the overall CTS 10 of FIG. 1 will not be contained herein. It will be appreciated, however, that the CTS 10 shown in FIG. 1 is merely illustrative and should not be construed as implying any limitations upon the scope of the present invention.

Figure 2:
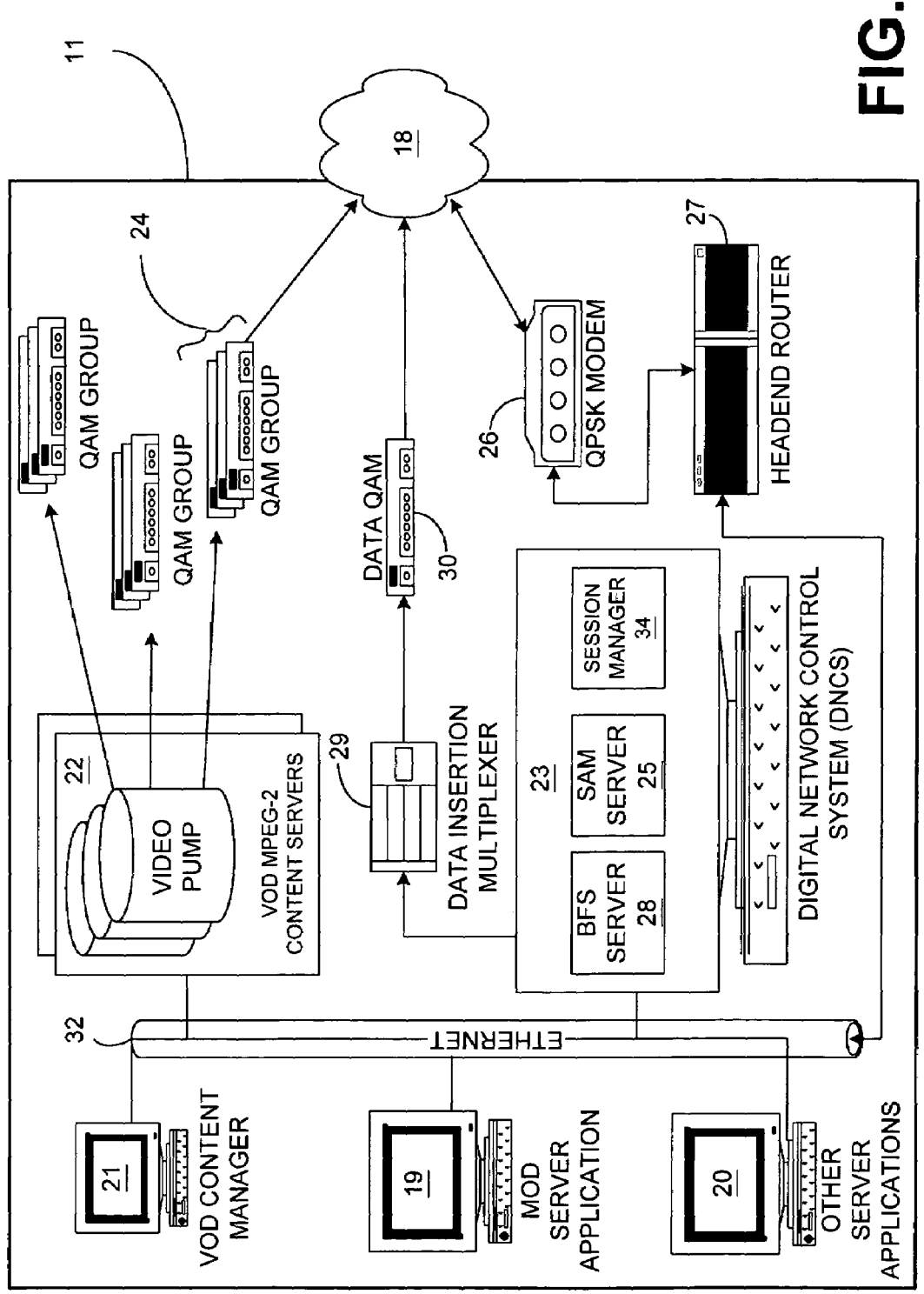
FIG. 2 is a diagram of the headend 11 as depicted in FIG. 1.

FIG. 2 is a block diagram of portions of a headend 11 that is configured to provide media-on-demand (MOD) services in accordance with one embodiment of the present invention. MOD services include, among other things, video-on-demand (VOD) services and respective MOD information suitable to be presented to a user via display of an interactive media guide. MOD server application 19 and a plurality of other server applications 20 are connected to a digital network control system (DNCS) 23 via a high-speed network such as an Ethernet connection 32. The MOD server application 19 is responsible for reserving and configuring system resources needed to provide MOD services and for providing configuration and service data to an MOD client application 63 (FIG. 3), including MOD information comprising a catalog of titles available for on-demand viewing and/or on-demand rental by a user.

The DNCS 23 provides complete management, monitoring, and control of the network's elements and broadcast services provided to users. In one implementation, the DNCS 23 uses a data insertion multiplexer 29 and a data QAM 30 to insert in-band broadcast file system (BFS) data into an MPEG-2 transport stream that is broadcast and received via DHCT's communication interface 42 and tuner system 45. The DNCS 23 also contains a session manager 34 that uses Digital Storage Media Command and Control (DSMCC) protocol to set up and maintain MOD sessions. The session manager 34 processes user to network (U-N) session signaling messages, manages allocation of session-related network resources, supports network management operations, acts as a point of contact to the network for the DHCT's 16 in the network 18 to establish individual sessions, and supports MOD services by providing the signaling interface to establish, maintain and release client initiated exclusive sessions.

A service application manager (SAM) server 25 is a server component of a client-server pair of components, with the client component being located at the DHCT 16. Together, the client-server SAM components provide a system in which the user can access services, which are identified by an application to run and a parameter, such as particular data content, specific to that service. The client-server SAM components also manage the life cycle of the applications on the system, including the definition, activation, and suspension of services they provide and the downloading of the applications into the DHCT 16 as necessary.

Applications on both the headend 11 and the DHCT 16 can access the data stored in a broadcast file system (BFS) server 28 in a similar manner to a file system found on operating systems. The BFS server 28 is a part of a broadcast file system that has a counterpart BFS client module 43 (FIG. 3) in a DHCT 16 connected to the network 18. The BFS server 28 repeatedly sends data for applications on a data carousel (not shown) over a period of time in cyclical repeated fashion so that a DHCT 16 that is in need of reading any particular data file or parts thereof may receive it when requested by a user or one or more of its internal running processes.

A VOD content manager 21 is responsible for managing the content on the VOD content servers 22. The MOD server application 19 controls both the VOD content manager 21 and the VOD content servers 22 and utilizes them to help deliver the video and audio streams that make up VOD services. In one embodiment, an MOD content manager and MOD content servers (not shown) could run respectively in parallel to the VOD content manager 21 and VOD content servers 22 to manage other types of on-demand media content. In an alternate embodiment an MOD content manager replaces the VOD content manager 21 and the MOD content servers replaces the VOD content servers 22. The QAM modulators that comprise the QAM group 24 receive the MPEG-2 transport streams from the VOD content servers 22, convert them into encrypted RF signals at a specified frequency (channel), and transmit them to a DHCT 16 via the network 18.

The QPSK modem 26 is responsible for transporting the out-of-band IP (internet protocol) datagram traffic between the distribution headend 11 and a DHCT 16. Data from the QPSK modem 26 is routed by headend router 27 within the headend 11. The headend router 27 is also responsible for delivering upstream application traffic to the various server applications 19 & 20.

Figure 3:
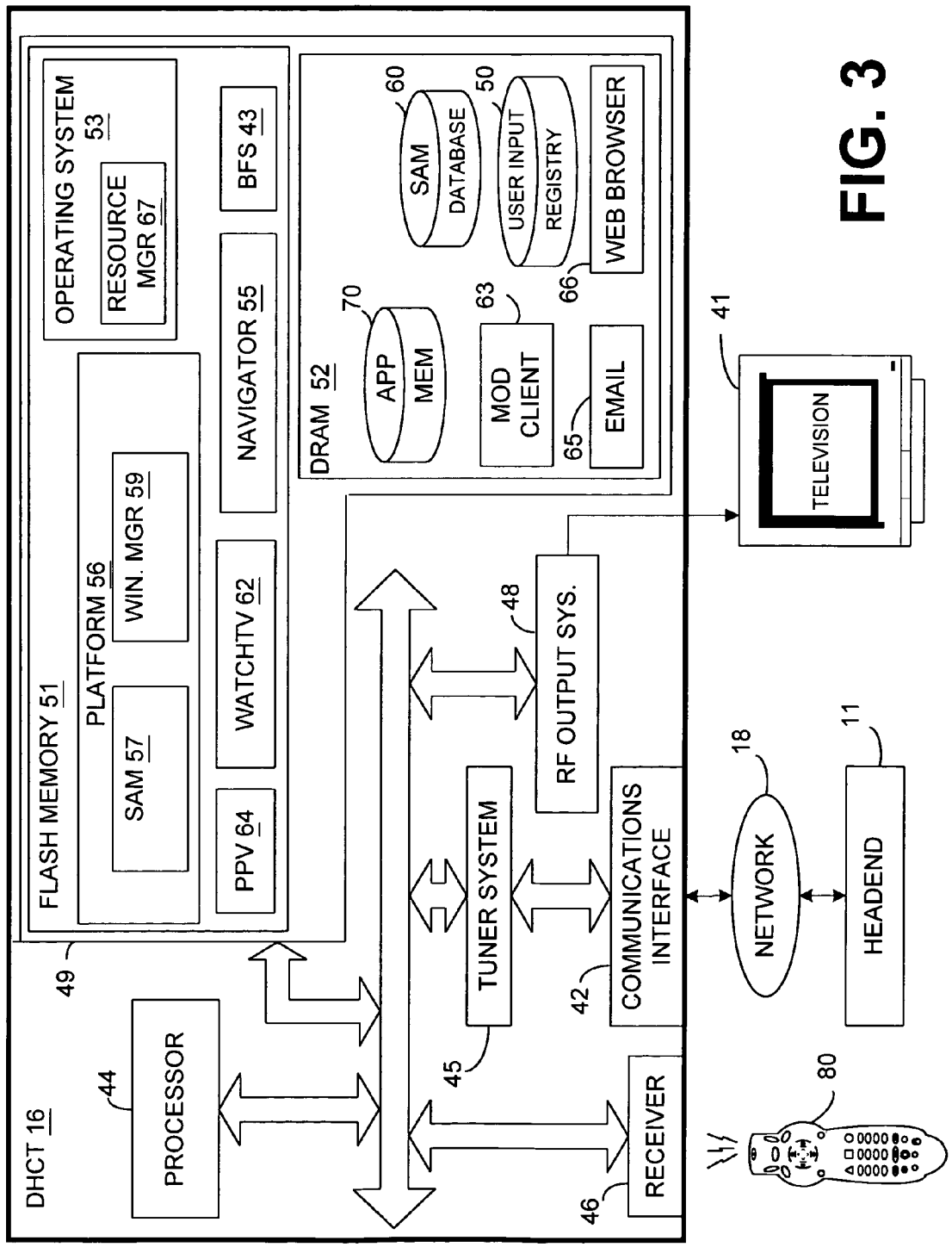
FIG. 3 is a block diagram of a DHCT and related equipment, in accordance with one preferred embodiment of the present invention depicted in FIG. 1.

FIG. 3 is a block diagram illustrating a DHCT 16 that is coupled to a headend 11 and to a television 41. Some of the functionality performed by applications executed in the DHCT 16 (such as the MOD client application 63) may instead be performed at the headend 11 and vice versa. A DHCT 16 is typically situated at a user's residence or place of business and may be a stand alone unit or integrated into another device such as, for example, a television set or a personal computer. The DHCT 16 preferably includes a communications interface 42 for receiving signals (video, audio and/or other data) from the headend 11 through the network 18 and for providing any reverse information to the headend 11 through the network 18. The DHCT 16 further includes at least one processor 44 for controlling operations of the DHCT 16, an RF output system 48 for driving the television display 41, and a tuner system 45 for tuning into a particular television channel to be displayed and for sending and receiving various types of data or media from the headend 11. The tuner system 45 includes, in one implementation, an out-of-band tuner for bi-directional quadrature phase shift keying (QPSK) data communication and a quadrature amplitude modulation (QAM) tuner for receiving television signals. Additionally, a receiver 46 receives externally-generated information, such as user inputs or commands from other devices.

The DHCT 16 may also include one or more wireless or wired interfaces, also called ports, for receiving and/or transmitting data to other devices. For instance, the DHCT 16 may feature USB (Universal Serial Bus), Ethernet (for connection to a computer), IEEE-1394 (for connection to media devices in an entertainment center), serial, and/or parallel ports. The user inputs may, for example, be provided by a computer or transmitter with buttons or keys located either on the exterior of the terminal or by a hand-held remote control device or keyboard that includes user-actuated buttons.

In one implementation, the DHCT 16 includes system memory 49, which includes flash memory 51 and dynamic random access memory (DRAM) 52, for storing various applications, modules and data for execution and use by the processor 44. Basic functionality of the DHCT 16 is provided by an operating system 53 that is primarily stored in flash memory 51. Among other things, the operating system 53 includes at least one resource manager 67 that provides an interface to resources of the DHCT 16 such as, for example, computing resources.

One or more programmed software applications, herein referred to as applications, are executed by utilizing the computing resources in the DHCT 16. Applications stored in flash memory 51 or DRAM 52 are executed by processor 44 (e.g., a central processing unit or digital signal processor) under the auspices of the operating system 53. Data required as input by an application is stored in DRAM 52 or flash memory 51 and read by processor 44 as need be during the course of the application's execution. Input data may be data stored in DRAM 52 by a secondary application or other source, either internal or external to the DHCT 16, or possibly anticipated by the application and thus created with the application at the time it was generated as a software application, in which case it is stored in flash memory 51. Data generated by an application is stored in DRAM 52 by processor 44 during the course of the application's execution. DRAM 52 also includes application memory 100 that various applications may use for storing and/or retrieving data.

An application referred to as navigator 55 is also resident in flash memory 51 for providing a navigation framework for services provided by the DHCT 16. The navigator 55 registers for and in some cases reserves certain user inputs related to navigational keys such as channel increment/decrement, last channel, favorite channel, etc. The client applications may be resident in flash memory 51 or downloaded into DRAM 52. The navigator 55 also provides users with television related menu options that correspond to DHCT functions such as, for example, providing an interactive program guide, blocking a channel or a group of channels from being displayed in a channel menu, and displaying a video-on-demand purchase list.

The flash memory 51 also contains a platform library 56. The platform library 56 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 56 that are shown in FIG. 3 are a window manager 59 and a service application manager client (SAM) 57.

The window manager 59 provides a mechanism for implementing the sharing of the screen regions and user input. The window manager 59 on the DHCT 16 is responsible for, as directed by one or more applications, implementing the creation, display, and de-allocation of the limited DHCT 16 screen resources. It allows multiple applications to share the screen by assigning ownership of screen regions, or windows. The window manager 59 also maintains, among other things, a user input registry 50 in DRAM 52 so that when a user enters a key or a command via the remote control device 80 or another input device such as a keyboard or mouse, the user input registry 50 is accessed to determine which of various applications running on the DHCT 16 should receive data corresponding to the input key and in which order. As an application is executed, it registers a request to receive certain user input keys or commands. When the user presses a key corresponding to one of the commands on the remote control device 80, the command is received by the receiver 46 and relayed to the processor 44. The processor 44 dispatches the event to the operating system 53 where it is forwarded to the window manager 59 which ultimately accesses the user input registry 50 and routes data corresponding to the incoming command to the appropriate application.

The SAM client 57 is a client component of a client-server pair of components, with the server component being located on the headend 11. A SAM database 60 in DRAM 52 includes a data structure of services and a data structure of channels that are created and updated by the headend 11. Many services can be defined using the same application component, with different parameters. Examples of services include, without limitation and in accordance with one implementation, presenting television programs (available through a WatchTV application 62), pay-per-view events (available through a PPV application 64), digital music (not shown), media-on-demand (available through an MOD application 63), and an interactive program guide. In general, the identification of a service includes the identification of an executable application that provides the service along with a set of application-dependent parameters that indicate to the application the service to be provided. As a non-limiting example, a service of presenting a television program could be executed with a set of parameters to view HBO or with a separate set of parameters to view CNN. Each association of the application component (tune video) and one parameter component (HBO or CNN) represents a particular service that has a unique service I.D. The SAM client 57 also interfaces with the resource manager 67, as discussed below, to control resources of the DHCT 16.

Application clients can also be downloaded into DRAM 52 at the request of the SAM client 57, typically in response to a request by the user or in response to a message from the headend. In this non-limiting example DRAM 52 contains a media-on-demand application (MOD) 63, an e-mail application 65, and a web browser application 66, among others (not shown). It should be clear to one with ordinary skill in the art that these applications are not limiting and merely serve as examples for this present embodiment of the invention. Furthermore, one or more DRAM based applications may, as an alternative embodiment, be resident in flash memory 51. These applications, and others provided by the cable system operator, are top level software entities on the network for providing services to the user.

In one implementation, applications executing on the DHCT 16 work with the navigator 55 by abiding by several guidelines. First, an application utilizes the SAM client 57 for the provision, activation, and suspension of services.

Second, an application shares DHCT 16 resources with other applications and abides by the resource management policies of the SAM client 57, the operating system 53, and the DHCT 16. Third, an application handles situations where resources are only available with navigator 55 intervention. Fourth, when an application loses service authorization while providing a service, the application suspends the service via the SAM (the navigator 55 will reactivate an individual service application when it later becomes authorized). Finally, an application client is designed to not have access to certain user input keys reserved by the navigator (i.e., power, channel +/−, volume +/−, etc.).

The MOD client application 63 provides the user with lists of available media titles to choose from and with video presentations requested by the user. The MOD client application 63 provides video presentations to the user by engaging, preferably, in a direct two-way IP (Internet Protocol) connection with VOD content servers 22 (FIG. 2).

An executable program or algorithm corresponding to an operating system (OS) component, or to a client platform component, or to a client application, or to respective parts thereof, can reside in and execute out of DRAM 52 and/or flash memory 51. Likewise, data inputted into or outputted from any executable program can reside in DRAM 52 or flash memory 51. Furthermore, an executable program or algorithm corresponding to an OS component, or to a client platform component, or to a client application, or to respective parts thereof, can reside in flash memory 51, or in a local storage device connected to DHCT 16 and can be transferred into DRAM 52 for execution. Likewise, data input for an executable program can reside in flash memory 51 or a storage device and can be transferred into DRAM 52 for use by an executable program or algorithm. In addition, data outputted by an executable program can be written into DRAM 52 by an executable program or algorithm and can be transferred into flash memory 51 or into a storage device for storage purposes. The present invention is not limited by where or how data and/or applications are stored or retrieved.

Each of the above mentioned applications comprises executable instructions for implementing logical functions and can be embodied in any computer-readable medium for use by or in connection with an instruction execution system, apparatus, or device, such as a computer-based system, processor-containing system, or other system that can fetch and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner, and then stored in a computer memory.

Figure 4:
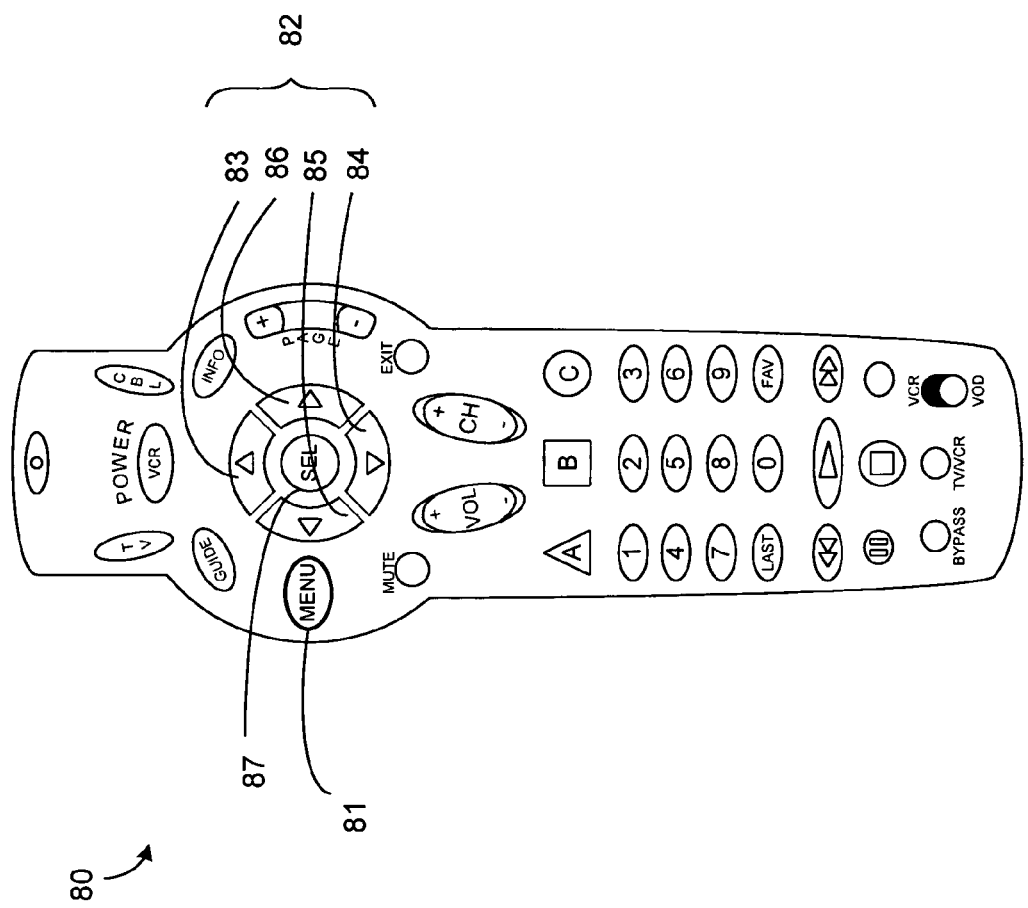
FIG. 4 is a block diagram of a remote control device that can be used to provide user input to the DHCT shown in FIG. 3.

FIG. 4 illustrates a non-limiting example of a remote control device 80 that is used to provide user input to the DHCT 16. The arrow buttons 82 include an up arrow button 83, a down arrow button 84, a left arrow button 85, and a right arrow button 86 that are used to scroll through options and/or to highlight an option. The select button 87 may be used to select a currently highlighted option that is provided to the user. Many alternative methods of providing user input may be used including a remote control device with different buttons and/or button layouts, a keyboard device, a voice activated device, etc. The invention described herein is not limited by the type of device used to provide user input.

Figure 5:
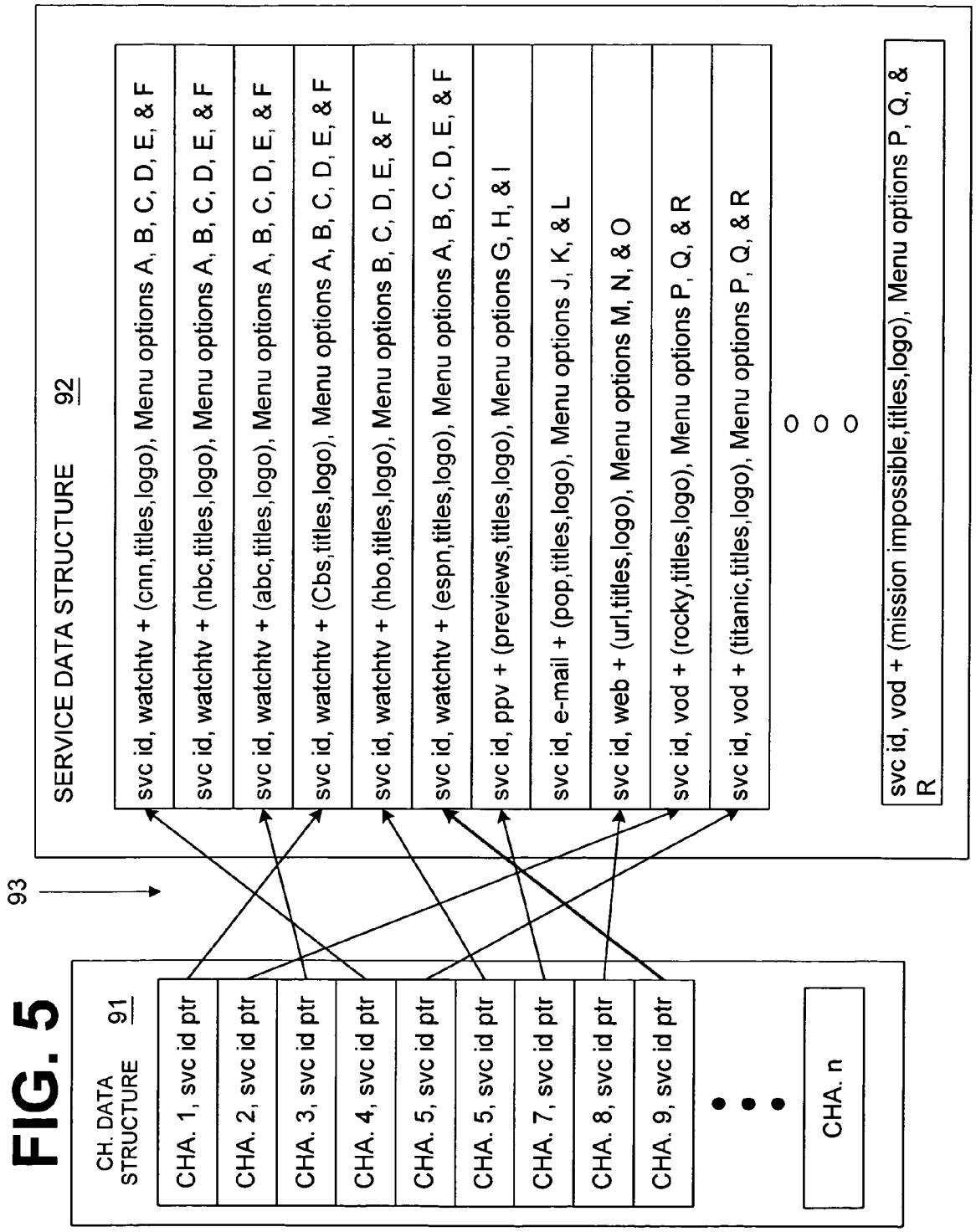
FIG. 5 depicts an example block diagram representation of channel and service data structures stored in the DHCT shown in FIG. 3.

As discussed above, the SAM database 60 includes channel and service data structures. Refer now to FIG. 5, which shows a block diagram representation of a channel data structure 91 and a service data structure 92. Each entry in the channel data structure 91 includes a channel number and a pointer to a service ID corresponding to an entry in the service data structure 92, as represented by arrows 93. Each entry in the service data structure 92 includes, in accordance with one implementation, a service ID, an application identifier, or Uniform Resource Locator (URL), a parameter (such as a television program name, etc.), a short title for the service, a long title for the service, a logo for the service, and one or more menu options. The menu options identified are menu options that are presented to a user in response to the DHCT 16 receiving a predefined input signal, such as, for example, a signal corresponding to the menu button 81 located on the remote control device 80 (FIG. 4). Of course, other implementations of the present invention include greater or fewer data structures with greater or fewer elements of information in each data structure entry. Typically, a system operator defines the channel data structure(s) 91 for the lineup of services to be provided in any particular system. Also, while a system operator may define the information contained in the service data structure 92, various applications in the DHCT 16 (FIG. 3) may also create entries into the service data structure 92 via a SAM server API. Many factors may be used to determine whether a menu option is associated with a particular service and/or channel. These factors include the actual and relative frequency that the menu option will be selected by users, whether a media provider desires such menu option to be provided to users accessing a service provided by the media provider, the feasibility of providing the functionality identified by the menu option, and alternative methods by which users may access the functionality provided by the menu option.

Figure 6:
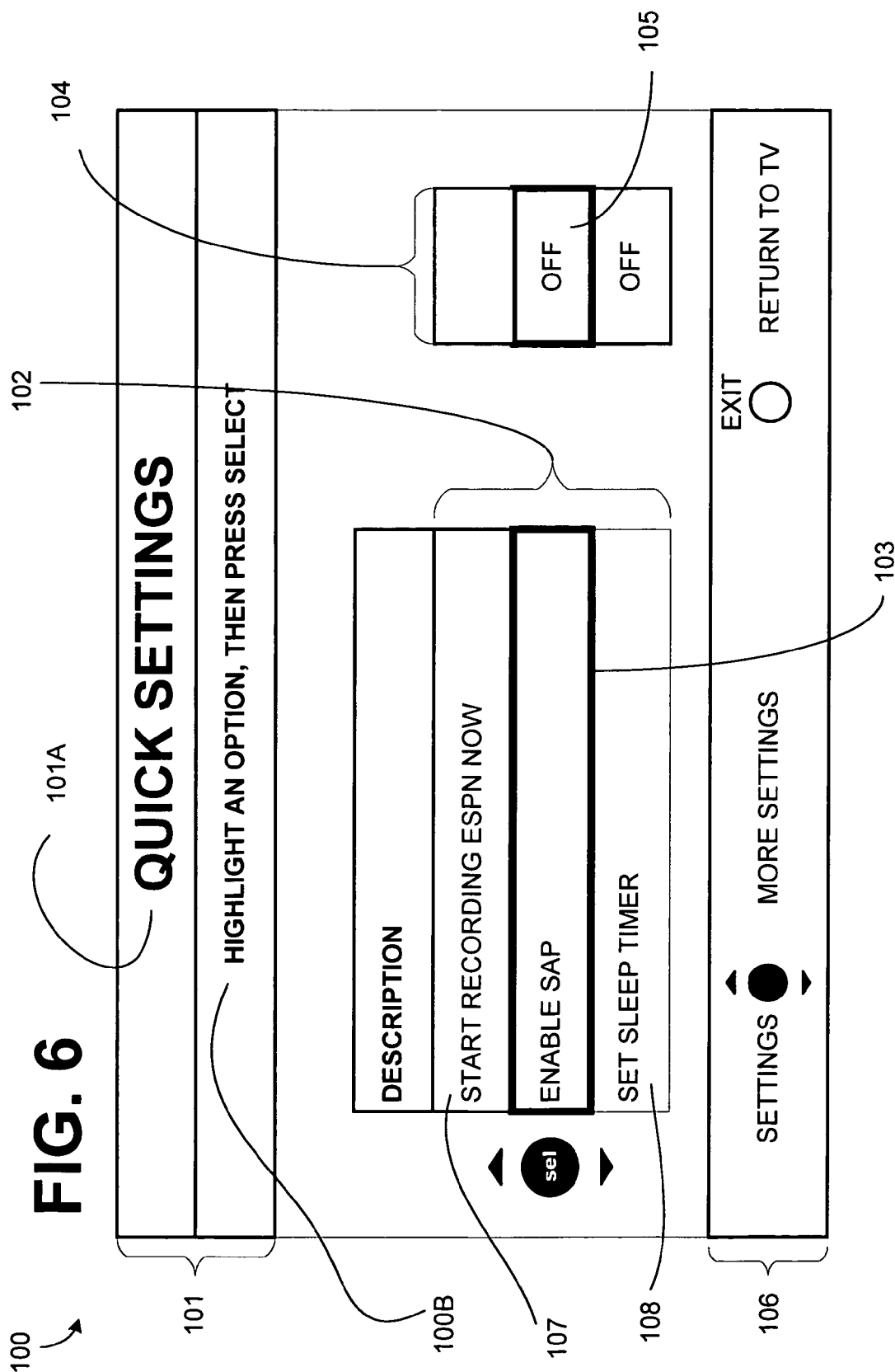
FIG. 6 depicts an example screen illustrating a quick settings menu that is provided by the DHCT shown in FIG. 3 to a user currently receiving an analog television service.

With continued reference to FIGS. 3 and 4 throughout the remaining figures, FIG. 6 is an example window 100 illustrating a quick settings menu that is provided in response to the activation of menu button 81, to a user currently receiving an analog television service. An example of an analog television service is a television program that is transmitted through analog signals. The window 100 includes a heading area 101, a highlighted option 103 within an options area 102, a highlighted status 105 within a status column 104, and a navigation instruction section 106. The heading area 101 includes a title for the window 101A and may include instructions, such as instruction 101B.

In this non-limiting example, options area 102 contains three selections: the first selection 107 corresponds to an option to record the currently tuned channel, the second selection (which is also the highlighted option 103) corresponds to an option to enable a second audio program (SAP), and the third selection 108 corresponds to an option to set a sleep timer. A status column 104 provides indications as to the status of the corresponding selections listed in the options area 102. In this example, the highlighted status area 105 indicates that the SAP service (which is currently the highlighted option 103) is not activated.

A highlighted status 105 of an entry field is differentiated from appearance of the same entry field in a non-highlighted location by one of any visual feedback mechanisms applied to highlighted status 105 such as darkening, brightening, flashing (or blinking), or special outlining on the edges of the highlighted status 75 field. Outlining options may include a different color or implementation of beveled edges to effect a visual indentation. Text colors can also be used to differentiate the highlighted area in combination with any of the other forms of differentiation.

In a preferred embodiment, pressing the select key 87 toggles the state of a highlighted status 105. In another embodiment, pressing left and right arrow keys also affect state of a highlighted status 105. In an alternate embodiment, the user selects a priori via configuration screens which of the two methods effects the state change, either via pressing left and right arrow keys or via pressing the select key 87. A first selected method by a user is active until a subsequent time when a user selects a second method.

In an alternate embodiment, an option that comprises two states such as "on" or "off" does not require a corresponding entry in the status column 104, and the active state of the respective option is inherent in the description comprised in highlighted area 103. For an option exhibiting more than two states, the user presses the left and right arrow keys to cycle in a consistent periodic fashion through the available selectable states and then presses the select key to activate the selected state.

Figure 7:
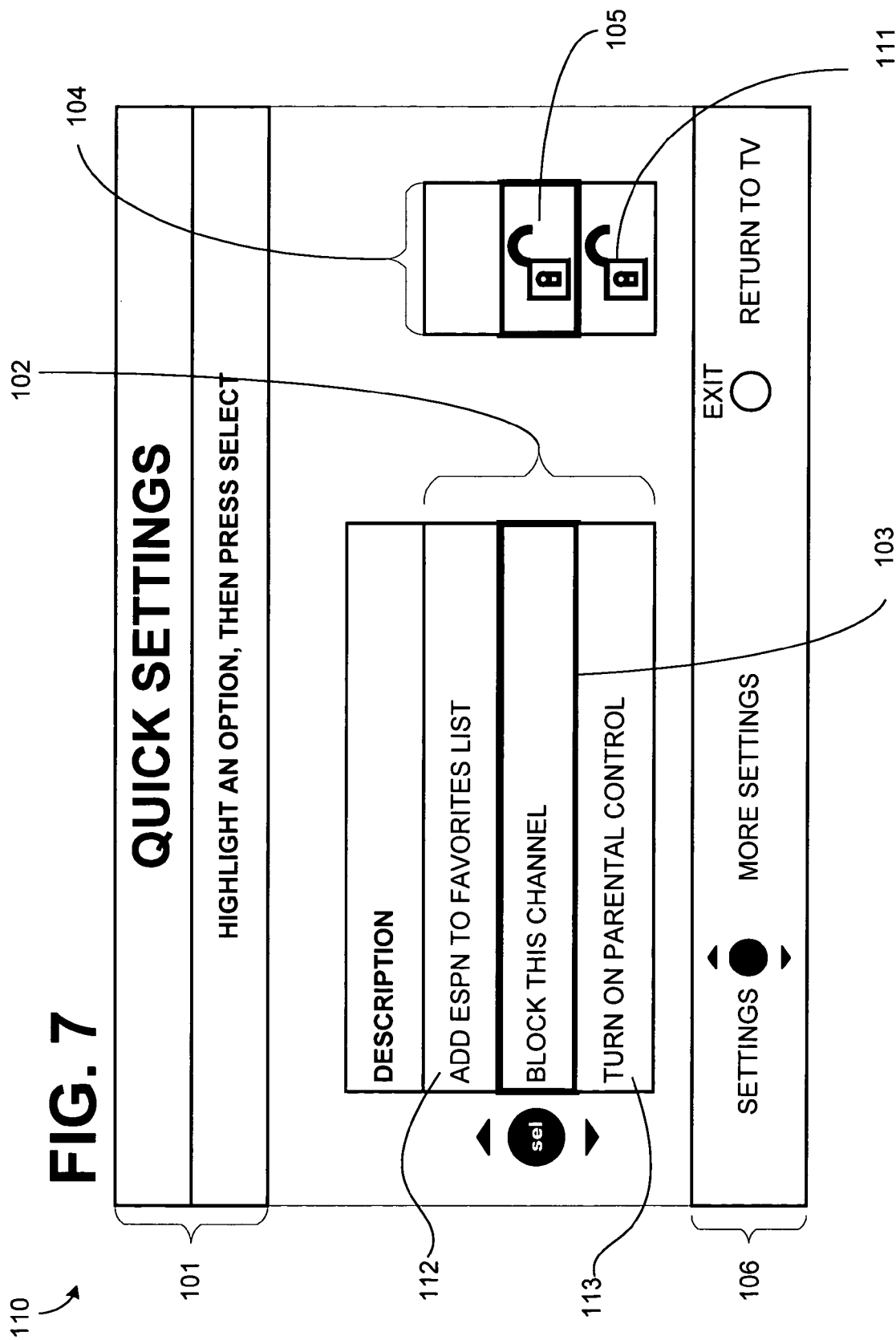
FIG. 7 depicts an example screen that illustrates additional options that can be accessed via the quick settings menu illustrated FIG. 6.

FIG. 7 is an example window 110 that illustrates additional options that are provided in options area 102 after a user scrolls through the quick settings menu illustrated in window 100 (FIG. 6) using the remote control device 80. The first selection 112 now corresponds to an option to add the currently tuned channel to a favorites list, the second selection (which is also the highlighted option 103) corresponds to an option to block the currently tuned channel, and the third selection 113 corresponds to an option to turn on parental control. An unlocked padlock symbol 111 in the status column 104 indicates that the corresponding service in the options area 102 is not currently activated. Therefore, in this example, the channel blocking and parental control services are not activated.

Figure 8:
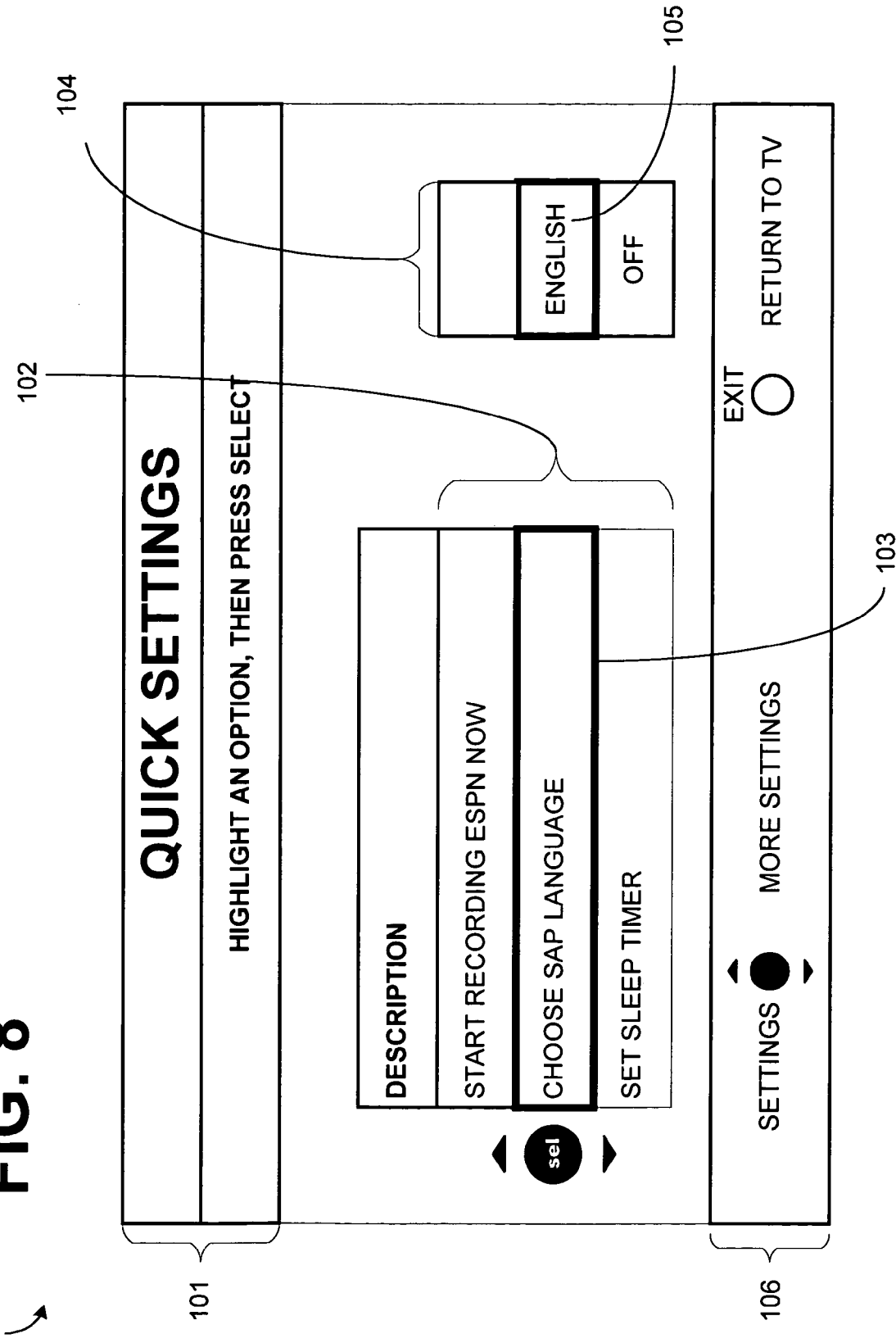
FIG. 8 depicts an example screen illustrating a quick settings menu that is provided by the DHCT shown in FIG. 3 to a user currently receiving a digital television service.

FIG. 8 is an example window 120 illustrating a quick settings menu that is provided in response to the activation of menu button 81, to a user currently receiving a digital television service. The digital television service may be, for example, a television program that is transmitted through digital signals. In one embodiment, a user can select the language by pressing the select button 87 until the desired language is indicated as the highlighted status 105. This example illustrates how a user may be provided with different television menu options in response to identical user inputs in cases where the television services being provided are different. Unlike example window 100, example window 120 offers a user the ability to choose the language in which the SAP service will be provided.

Figure 9:
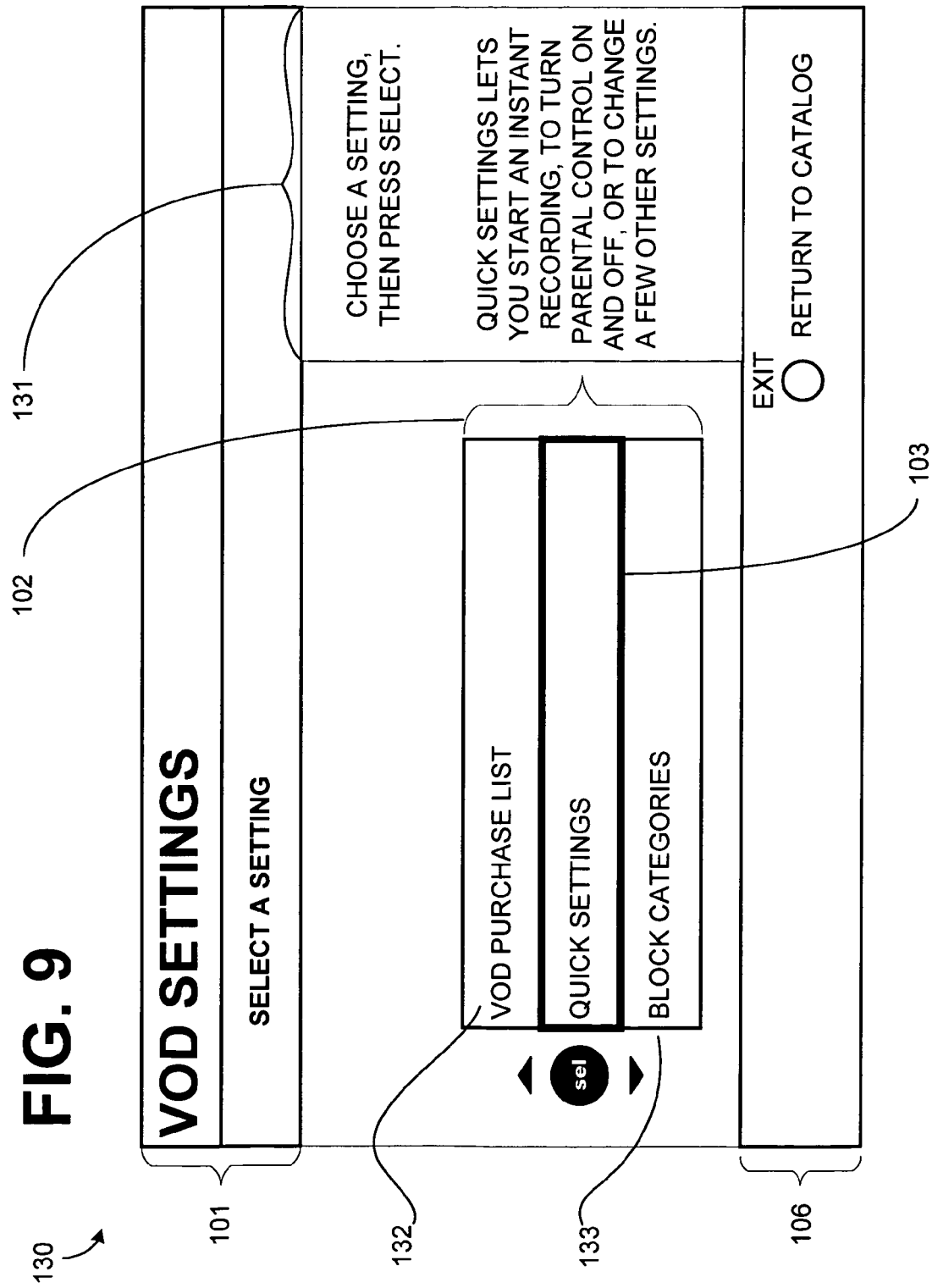
FIG. 9 depicts an example screen illustrating a video-on-demand (VOD) settings menu that is provided by the DHCT shown in FIG. 3 to a user currently receiving a VOD service.

FIG. 9 is an example window 130 illustrating a video-on-demand (VOD) settings menu that is provided in response to the activation of menu button 81 on the remote control device 80, to a user currently receiving a VOD service. In this non-limiting example, the window 130 includes an options area 102 containing three selections: a VOD purchase list 132, a quick settings menu, and a "block categories" option 133. The highlighted option 103, in this example, is a quick settings menu selection that can be used to access a quick settings menu similar to the one shown in FIG. 8. Information section 131 contains information about the currently highlighted option as well as instructions on using the menu. It can be seen from this example that the menu presented to the user is responsive to the service that is presented to the user. Unlike the example in FIG. 6, the user is not immediately presented with a quick settings menu but is instead provided with options that the user is more likely select while viewing a VOD channel or service.

FIG. 10 is an example window 140 that illustrates a VOD purchase list 141 that is provided to a user after the user selects the VOD purchase list option 132 while being presented with window 130 (FIG. 9). The VOD purchase list 141 includes at least one previously purchased VOD title 142 and/or a highlighted purchased VOD title 143 for which a user was billed or is yet to be billed. Thus, a user can review charges associated with VOD titles previously purchased. Each entry in the list indicates the name of the VOD title, the length of the viewing access period, and the date that the title was presented. A user can typically access additional information related to a currently highlighted VOD title by activating the select button 87.

FIG. 11 is an example window 150 that illustrates VOD title blocking in a VOD catalogue via a categories list 151 that is provided to a user after the user selects the block categories option 133 while being presented with window 130 (FIG. 9). The block categories list includes a block category 152 and a highlighted block category 153. Once a user blocks a category, media events falling under the selected category will not be shown in a VOD catalogue. A locked padlock symbol 154 is used to indicate that a category is currently blocked.

In another embodiment of the present invention, a user is provided, in response to user input, with a context sensitive television help menu for accessing help information pertaining to the respective service, application or DHCT machine-state that is currently active. Whether a certain help menu option is included in the television help menu depends on the service that is being provided to the user at the time that the user requests the television help menu. In yet another embodiment, a user is provided, in response to user input, with a context sensitive service information menu for accessing service related information. Whether a certain information menu option is included in the service information menu depends on the service that is being provided to the user at the time that the user requests the service information menu.

Information related to user selections and preferences reflected by user input described above is stored in application memory 70 of DRAM 52 or read-write non-volatile memory (not shown) of DHCT 16 and/or a VOD server. If DHCT 16 has a local storage device, either internally or externally connected via a communication port or local storage interface, it can be used to alternatively store user selection information rather than employing the VOD server or in addition to the VOD server. Information related to user selections and preferences described herein is read from DHCT's memory to fill respective data fields in screens presented to a user. Alternatively, user selection information can be read from the DHCT's local storage (if applicable) or the VOD server. Regardless of where user selection information is stored, a subset of information is stored in read-write non-volatile memory of DHCT 16 by the application executing in DHCT 16 to find a backed-up version of user selection information in the event that DHCT 16 experiences a power outage period. This set of information is stored in non-volatile memory includes an indication as to whether there is user selection information (for which a single bit of non-volatile memory can be designated), and information such as a directory path or user identification for where a copy of the information can be retrieved from the VOD server or from the DHCT's local storage device (if applicable).

It should be emphasized that the above-described embodiments of the present invention, particularly, any "preferred embodiments" are merely possible examples of the implementations, merely setting forth for a clear understanding of the principles of the inventions. Many variations and modifications may be made to the above-described embodiments of the invention without departing substantially from the spirit of the principles of the invention. All such modifications and variations are intended to be included herein within the scope of the disclosure and present invention and protected by the following claims.

We claim:

1. A method for providing a television menu comprising:
    storing, in a memory associated with a settop terminal (STT), a channel data structure comprising a first channel entry and a second channel entry, the first channel entry comprising a first channel number and a first pointer to a first service identifier, the second channel entry comprising a second channel number and a second pointer to a second service identifier, the first and second service identifiers corresponding to first and second services provided in a cable television system;
    storing, in the memory associated with the STT, a service data structure comprising a first service entry and a second service entry, the first service entry comprising the first service identifier, a first identifier of a first executable software application associated with the first service identifier, and a first menu option, the second service entry comprising the second service identifier, a second identifier of a second executable software application associated with the second service identifier, and a second menu option, the first and second menu options contextually related to the first and second services identifiers, respectively;
    receiving user input to select one of the first channel number or the second channel number via the STT;
    receiving an input signal from a user input to provide a television menu;
    responsive to the input signal, automatically determining whether to present the first menu option or the second menu option to the user based on whether the first or second service identifier is linked by the respective first or second pointer associated with the selected television channel; and
    displaying either the first or second menu option depending on the determination.

2. The method for providing a television menu of claim 1, further comprising providing the first or second service associated with the respective first or second service identifier, wherein the first or second service provided is identified by an operating system.

3. The method for providing a television menu of claim 1, further comprising providing the first or second service associated with the respective first or second service identifier, wherein the first or second service is identified by information previously stored in memory.

4. The method for providing a television menu of claim 1, wherein the input signal corresponds to a predefined input signal.

5. The method for providing a television menu of claim 1, wherein the first executable software application is the same application as the second executable software application.

6. The method for providing a television menu of claim 1, wherein the first executable software application is a different application than the second executable software application.

7. A programmable television services client device that provides television control services, said client device comprising:
    a device configured to select one of a plurality of television channels;
    memory with logic stored therein, the memory further configured to store:
        a channel data structure comprising a first channel entry and a second channel entry, the first channel entry comprising a first channel number and a first pointer to a first service identifier, the second channel entry comprising a second channel number and a second pointer to a second service identifier, the first and second service identifiers corresponding to first and second services provided in a cable television system; and
        a service data structure comprising a first service entry and a second service entry, the first service entry comprising the first service identifier, a first identifier of a first executable software application associated with the first service identifier, and a first menu option the second service entry comprising the second service identifier, a second identifier of a second executable software application associated with the second service identifier, and a second menu option, the first and second menu options contextually related to the first and second services identifiers, respectively; and
    a processor coupled to said memory and configured with the logic to receive an input signal from a user input, and responsive to the input signal, automatically determine whether to present the first menu option or the second menu option to the user based on whether the first or second service identifier is linked by the respective first or second pointer associated with the selected television channel, and display either the first or second menu option depending on the determination.

8. The programmable television services client device of claim 7, wherein the processor is further configured with the logic to present the first or second service corresponding to the respective first or second service identifier, the first or second service identified by information previously stored in memory.

9. The programmable television services client device of claim 7, wherein the processor is further configured with the logic to present the first or second service corresponding to the respective first or second service identifier, the first or second service identified by an operating system.

10. The programmable television services client device of claim 7, wherein the input signal corresponds to a predefined input signal.

11. The programmable television services client device of claim 7, wherein the first executable software application is the same application as the second executable software application.

12. The programmable television services client device of claim 7, wherein the first executable software application is a different application than the second executable software application.

13. A programmable television services client device that provides television control services, said client device comprising:
 a device configured to select one of a plurality of television services;
 memory with logic stored therein, the memory configured to store:
  a service data structure comprising a first service entry and a second service entry, the first service entry comprising the first application identifier, a first identifier of a first executable software application associated with the first application identifier, and a first menu option, the second service entry comprising the second application identifier, a second identifier of a second executable software application associated with the second application identifier, and a second menu option, the first and second menu options contextually related to the first and second applications identifiers, respectively; and
 a processor coupled to said memory and configured with the logic to receive an input signal from a user input corresponding to a menu command, and responsive to receiving the input signal:
  identify a television service that is currently being provided to the user, the television service being provided to the user by the first or second executable software application identified by the respective first or second application identifier;
  automatically determine whether to present the first menu option or the second menu option based on the selected channel and based on associating entries in the channel data structure and the service data structure with the selected channel; and
  display either the first or second menu option depending on the determination, wherein the first menu option and the second menu option are provided for each and every respective television service of the plurality of television services in response to selection thereof.

14. The programmable television services client device of claim 13, wherein the television service is selected from a group consisting of:
 a purchasable media presentation, a non-purchasable media presentation, a digital transmission, an analog transmission, a television control service, an information service, and a communication service.

15. The programmable television services client device of claim 13, wherein the television service provided is identified by information previously stored in memory.

16. The programmable television services client device of claim 13, wherein the television service provided is identified by an operating system.

17. The programmable television services client device of claim 13, wherein the user input corresponds to a predefined input signal.

18. The programmable television services client device of claim 7, wherein the first executable software application is the same application as the second executable software application.

19. The programmable television services client device of claim 7, wherein the first executable software application is a different application than the second executable software application.

20. A method for providing a television menu comprising:
 receiving a plurality of television services via a settop terminal (STT);
 storing, in a memory associated with the STT, a service data structure comprising a first service entry and a second service entry, the first service entry comprising the first application identifier, a first identifier of an executable software application associated with the first application identifier, and a first menu option, the second service entry comprising the second application identifier, a second identifier of an executable software application associated with the second application identifier, and a second menu option, the first and second menu options contextually related to the first and second applications identifiers, respectively;
 in response to receiving user input, selecting one of the plurality of television services via the STT;
 receiving an input signal from a user input corresponding to a menu command to provide a television menu based on the selected television service;
 responsive to receiving the input signal, identifying a television service that is currently being provided to the user via the STT, the television service being provided to a user by the executable software application identified by the respective first or second application identifier; and
 providing a television menu corresponding to either the first or second menu option that is selected based on the identified television service that is currently being provided to the user via the STT, wherein the first menu option and the second menu option are provided for each and every respective television service of the plurality of television services in response to selection thereof.

21. The method for providing a television menu of claim 20, wherein the television service is selected from a group consisting of:
 a purchasable media presentation, a non-purchasable media presentation, a digital transmission, an analog transmission, a television control service, an information service, and a communication service.

22. The method for providing a television menu of claim 20, wherein the television service provided is identified by an operating system.

23. The method for providing a television menu of claim 20, wherein the television service is identified by information previously stored in memory.

24. The method for providing a television menu of claim 20, wherein the input signal corresponds to a predefined input signal.

* * * * *